UNITED STATES PATENT OFFICE.

JOHN HENRY NIEMANN, OF ADELAIDE, SOUTH AUSTRALIA, AUSTRALIA.

TREATMENT OF REFRACTORY AURIFEROUS ORES.

1,222,789.

Specification of Letters Patent.

Patented Apr. 17, 1917.

No Drawing.

Application filed July 14, 1913. Serial No. 779,015.

*To all whom it may concern:*

Be it known that I, JOHN HENRY NIEMANN, a subject of the King of Great Britain, residing at 20 Waymouth street, Adelaide, in the State of South Australia, in the Commonwealth of Australia, chemist, have invented certain new and useful Improvements in and Relating to the Treatment of Refractory Auriferous Ores, of which the following is a specification.

This invention relates to an improved method of economically extracting, separating, and recovering the precious metal constituents of refractory auriferous ore or orestuff containing selenium, or seleniferous material yielding a salt or compound of selenium.

From experiments, I have found that selenium in the presence of certain elements or compounds possesses some especial decomposing or double decomposing properties; for instance it combines more readily with the reduced metal than the liberated oxygen; it has a special "selective affinity" for metals most frequently found free or natively pure, such as gold, bismuth, and copper; and it combines most readily with metals which most readily part with their oxygen such as mercury, silver, iron, lead, and arsenic.

As selenium and gold have a "selective affinity" for each other, forming gold selenid, and selenid of gold may be readily converted into soluble seleno-cyanid of gold, also selectively, I have found that the greater part of the gold in auriferous ore either natively or artificially containing or yielding selenium, may be dissolved in a cyanid solution, quickly, and cheaply, and selectively, and recovered by the utilization of the selenium in a cyaniding operation followed by retorting in the manner hereinafter described.

I therefore accomplish my objects of effectually dissolving, separating and recovering the gold, and of separating and recovering the other desirable constituents from refractory auriferous ore, either natively or artificially containing or yielding selenium, after the addition thereto where necessary of seleniferous ore, or material yielding a salt or compound of selenium, by controlling and utilizing the decomposing or double decomposing effect of selenium, upon the metallic constituents of the auriferous material; and, by checking the oxidation of the sulfids, selenids and arsenids of the base metallic constituents, from the initial crushing of the material to the final smelting of the resulting bullion; and, by utilizing and controlling other inherent peculiar properties of selenium such as its special affinity for certain metals, and its peculiar solvent, thermal, electrical and chemical action in the dissolving deposition, separation and refining of gold, by subjecting the crude ore with the contained or admixed selenium to a grinding or crushing operation with or in a weak solution of cyanid, to form a soluble seleno-cyanid of gold, during which process the oxidation or oxygenation of the material or the solution is prevented as much as possible in order to minimize the formation of seleno-cyanids of base metals. The resulting cyanid solution is passed through zinc boxes to extract the gold from solution; and the resulting depositions or precipitates are retorted without the admission of air, wherein the sublimable elements or compounds are sublimed and collected and treated as hereinafter described; and the auriferous residue left in the retort is smelted.

For the purpose of my invention, I crush and grind the crude auriferous ore or metalliferous material by usual methods, except that instead of water and in order to prevent oxidation I use at the outset a weak cyanid solution of a suitable strength, adjusted according to assay results as with ordinary cyanidation. With the same cyanid solution, the finely ground material is then transferred to and agitated within vats, preferably deep and covered, for say twenty-four hours or until the recoverable gold is dissolved under ordinary working conditions.

The cyanid solution used for crushing and grinding purposes, is pumped back repeatedly and re-used. This insures the dissolving of the bulk of such gold as may at first float on the surface, in the form of selenid, filmy or float amalgam, or in other combinations or forms, while the agitation process insures the solution of the remainder of such gold, thus preventing all flotation loss.

The use of cyanid solution at the outset, in the presence of selenium, shortens the time required for dissolving the gold, while the re-use of the cyanid solution has the additional advantage of enabling the ore to be crushed and treated with great economy of water.

After treatment in the agitator vats, and clarification in settling vats, the cyanid solution containing the dissolved gold is run through extractor boxes of ordinary type, and electrolyzed if necessary, to assist the deposition or aggregation of precipitates, or such as the evolution of hydrogen accompanied by the solution of zinc fines from the zinc boxes.

During the process of extraction and deposition of the gold from solution, the moderate and regular evolution of hydrogen normally occurs and is insured by usual methods, in order to promote the evolution of arseniureted or antimoniureted hydrogen should arsenic or antimony be deposited in the extractor boxes.

Immunity from volatilization loss, through the formation of seleniureted or sulfureted hydrogen, is insured, because these gases form selenids or sulfids of metals held dissolved in the cyanid solution, and are precipitated in the boxes as selenids or sulfids; a further precaution against loss being taken, by passing the solution issuing from the extractor boxes through a suitable filtering apparatus interposed between the box and the sump, whereby I arrest any gold which might otherwise escape as a flocculent selenid.

All the metalliferous constituents deposited upon the plates, or precipitated therefrom as slimes, are collected, well washed with water, and drained well. If necessary they are then mixed with such materials as may be required to prevent the caking of the mass, to regulate decomposition or to specially promote the sublimation of volatile metallic constituents such as mercury.

The drained slimes alone, or the drained slimes mixed with other material as before described, are then heated for eight (8) hours, more or less, in a suitable retort and allowed to cool. The retort is connected with condensing chambers to arrest the sublimates, which may contain some gold and silver, mixed with the selenium, zinc, arsenic, lead, sulfur, and other volatile elements, the elimination of which, is the object of the retorting process. Owing to the double decomposing action of selenium, these volatile elements are as effectually liberated from their combinations in the retort, without their access of air, as with the ordinary roasting or other open air processes. These sublimates are collected, and retorted again, preferably by fractional methods, which is essential if bismuth be a constituent of the material treated. The bullion left in the retort, as a fine powder, is smelted by ordinary methods, except that if any selenium be retained by the bullion, the crucibles used, and the fluxes employed, are necessarily those best adapted for conducting the smelting operation in an atmosphere free from oxygen.

If necessary to further prevent oxidation, hydrogen or other suitable gases may be passed into the molten metal in the crucibles. Should the bullion after this treatment, still contain selenium, it may be alloyed with copper and electrolyzed to separate the selenium by the methods usually employed for the recovery of gold from copper electrolytically, before being re-smelted.

I claim,—

1. The method of treating refractory auriferous ore, which comprises comminuting the unroasted ore in the presence of selenium or a selenium compound and a weak cyanid solution while excluding air or oxygen.

2. The method of treating refractory auriferous sulfid ores, which comprises forming a solution containing seleno-cyanid of gold from the native ore, maintaining said solution substantially free from oxidation, and causing the precipitation of the gold from said solution under substantially non-oxidizing conditions with relation to selenium.

3. The method of treating refractory auriferous ores, which comprises treating the raw ore with a weak cyanid solution in the presence of seleniferous material under non-oxidizing conditions, causing the precipitation of gold from said solution under like conditions in slimes, and retorting the slimes in a non-oxidizing atmosphere.

4. The method of treating refractory auriferous ores, which comprises treating the raw ore with a weak cyanid solution in the presence of seleniferous material and under non-oxidizing conditions, precipitating the gold from the solution in slimes in a non-oxidizing atmosphere, distilling the slimes to recover values other than gold, and retorting the gold residues in a reducing atmosphere.

In testimony whereof I have affixed my signature in presence of two witnesses.

JOHN HENRY NIEMANN.

Witnesses:
 CHARLES HARKELL,
 LUCY GREEN.